S. C. BRINSER.
Horse-Rake.
No. 8,983. Reissued Dec. 2, 1879.
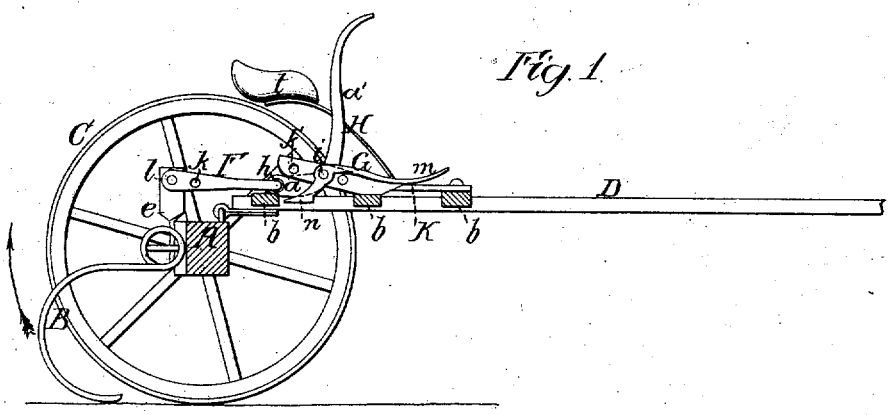
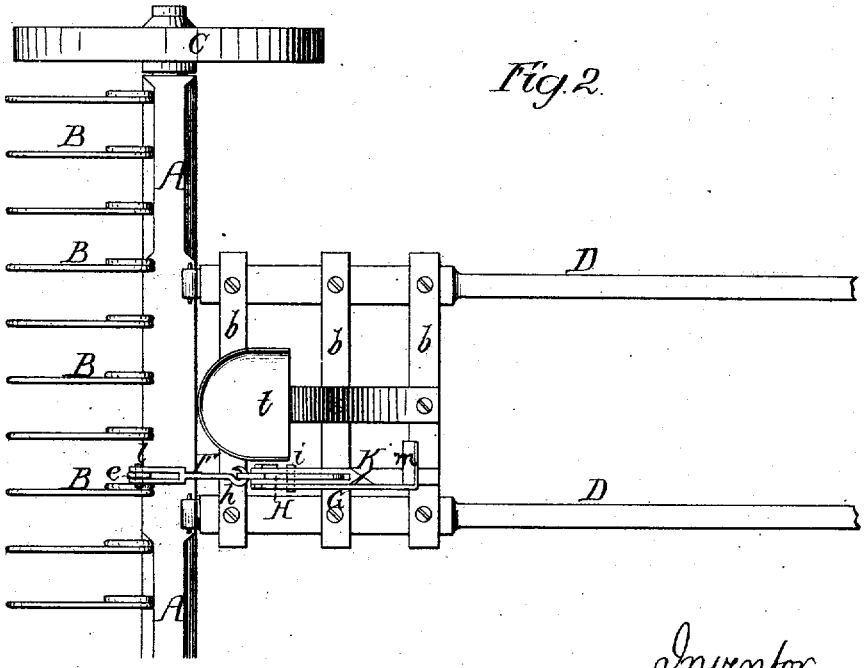
Witnesses
Henry Howson Jr.
Harry Smith
Inventor
Solomon C. Brinser
by his Attorneys
Howson and Son
N. PETERS, PHOTO-LITHOGRAPHER, WASHINGTON, D. C.

2 Sheets—Sheet 2.
S. C. BRINSER.
Horse-Rake.
No. 8,983. Reissued Dec. 2, 1879.
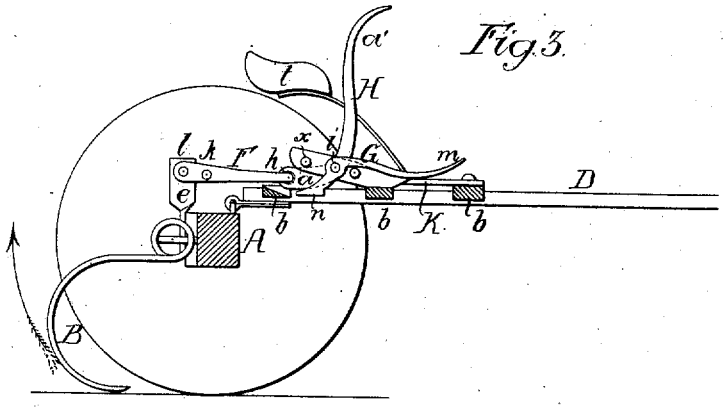
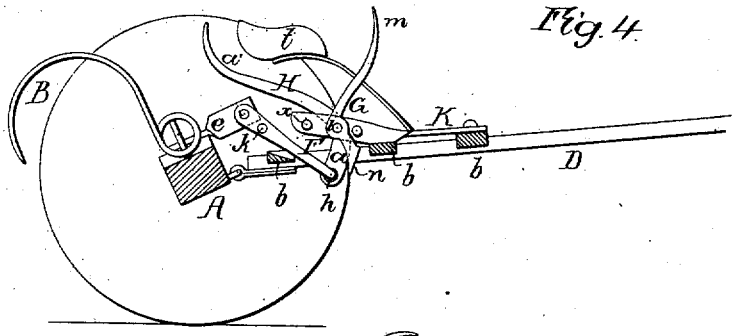
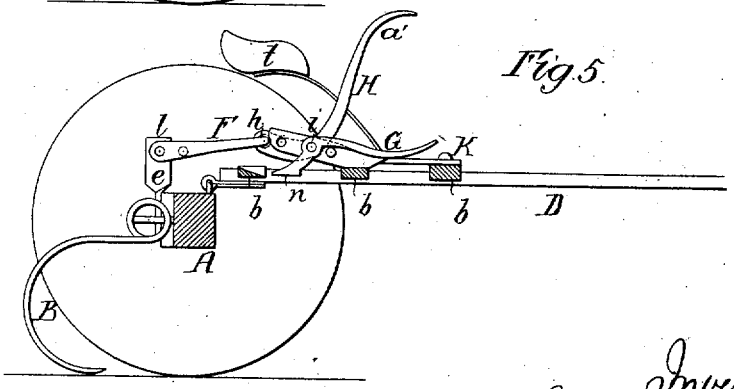
Witnesses
Henry Howson Jr
Harry Smith
Inventor
Solomon C. Brinser
by his Attorneys
Howson and Son
N. PETERS, PHOTO-LITHOGRAPHER, WASHINGTON, D. C.

UNITED STATES PATENT OFFICE.

SOLOMON C. BRINSER, OF MIDDLETOWN, PENNSYLVANIA.

IMPROVEMENT IN HORSE-RAKES.

Specification forming part of Letters Patent No. 83,452, dated October 27, 1868; Reissue No. 8,983, dated December 2, 1879; application filed May 20, 1879.

*To all whom it may concern:*

Be it known that I, S. C. BRINSER, of Middletown, Dauphin county, Pennsylvania, have invented certain Improvements in Horse-Rakes, of which the following is a full, clear, and exact description.

The main object of my invention is to combine the head of the rake with certain mechanism, fully described hereinafter, whereby the rake may be easily held to its work when used as a self-tilting rake, a further object being to provide for the easy retention of the rake in such a position that it is prevented from tilting. These objects I attain in the manner which I will now proceed to describe, reference being had to the accompanying drawings, in which—

Figure 1 is a longitudinal section of a horse-rake with my improvements; Fig. 2, a plan view of the same; Fig. 3, a view of the rake when in operation as a tilting rake; Fig. 4, a view of the rake when tilted, and Fig. 5 a view of the rake when locked in position so as to be prevented from tilting.

A is the axle, which forms the rake-head, the rake-teeth B being secured directly to the same. The axle is supported by the wheels C C, and to said axle are connected the thills or shafts D D, on which rest transverse beams *b b*.

Secured to the foremost of these beams is a plate, K, which is forked at the rear end, a bell-crank lever, H, being embraced by the said forked end of the plate, and being pivoted thereto by a pin, *i*. To an opening, *h*, at the end of the short arm *a* of this lever, is adapted the hooked front end of a rod, F, the rear end of the latter being provided with a number of openings, *k*, through any one of which may be passed a pin, *l*, by which the rear end of the rod is connected to the upper end of an arm, *e*, projecting from the axle or rake-head A.

By means of the openings *k* the draft of the rake may be controlled, for the more advanced the opening through which the pin *l* is inserted the higher will the rake-teeth be lifted from the ground when the rake is in operation.

When the rake is at work as a self-tilting rake, the parts are in the position shown in Figs. 1 and 3, the upper end of the long arm *a'* of the lever H being adjacent to the driver's seat *t*, and the upper edge of the short arm *a* of said lever resting against a stop-pin, *x*, adapted to holes *k'*, near the rear end of the plate K, so that the joint *h*, between the rod F and the arm *a* of the lever, is slightly below a line drawn through the centers of the pins *l* and *i*.

As long as pressure is exerted upon the upper end of the arm *a'* of the lever H, tending to keep the parts in this position, the points of the rake-teeth are kept close to the ground; but when it is desired to permit the rake to tilt such pressure is removed, and the rake is then free to swing up in the direction of the arrow, the joint *h* being depressed as the rake-head A turns. (See Fig. 4.)

Owing to the fact that the pressure on the rake is transmitted to the arm *a* of the lever almost in direct line therewith, a slight forward pressure of the driver's hand on the upper end of the arm *a'* of the lever, adjacent to the driver's seat *t*, is all that is necessary to keep the rake at work.

If it is desired to lock the rake-teeth so as to prevent any automatic tilting of the same, the stop-pin *x*, above alluded to, is dispensed with, and the lever H so operated as to bring the points *l*, *h*, and *i* into line with each other, or so that the point *h* is slightly above a line drawn through the points *l* and *i*, (see Fig. 5,) in which case it will be impossible for the rake-head or axle A to rotate upon its bearings until the lever H has first been operated so as to depress the joint *h*.

In order to prevent the lever H from being moved too far when locking, the plate K may be provided with a suitable stop located in advance of the lever.

When the rake is fully tilted, the upper end of the arm *a'* of the lever H is in the rear of the driver's seat; but in order to bring it back into position again, it is only necessary to depress the treadle *m*, forming part of a lever, G, which is pivoted to the pin *i*, the short arm of this lever carrying a stirrup, *n*, which bears against the short arm *a* of the lever H.

When the parts are in the position shown in Fig. 1, the lever G may also be used to aid in keeping the parts in this position, as any pressure on the treadle *m* would then tend to keep the arm *a* of the lever H pressed against the stop-pin *x*.

I claim as my invention—

1. The combination of the rake-head and its arm *e*, the lever H, the connecting-rod F, and a stop, *x*, arranged so as to prevent the accidental locking of the head by the movement of the lever, and so as to lessen the force exerted on said lever by maintaining the points *l*, *h*, and *i* almost in line with each other, as set forth.

2. The combination of the rake-head and its arm *e*, the connecting-rod F, the lever H, and the supplementary lever G, as set forth.

In testimony whereof I have signed my name to this specification in the presence of two subscribing witnesses.

SOLOMON C. BRINSER.

Witnesses:
T. C. LAVERTY,
HENRY B. ENGLE.